Oct. 27, 1970
V. E. PORTER
3,536,977
CONTROL CIRCUIT FOR STOPPING A MOTOR IN RESPONSE
TO A TORQUE OVERLOAD
Filed Aug. 21, 1967
2 Sheets-Sheet 1
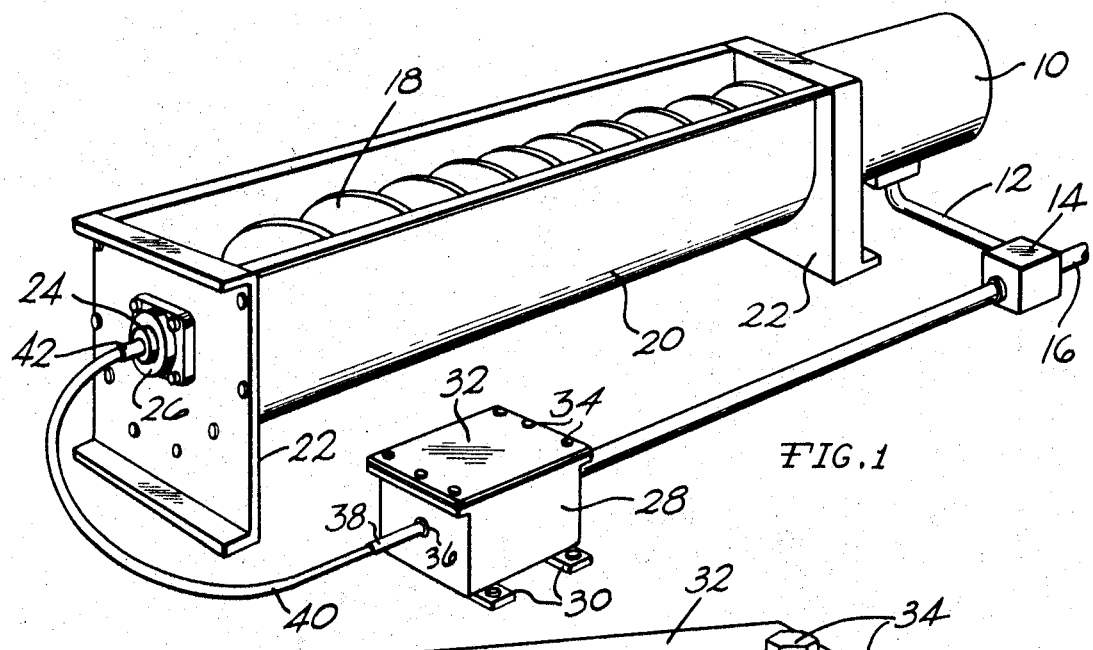
FIG.1
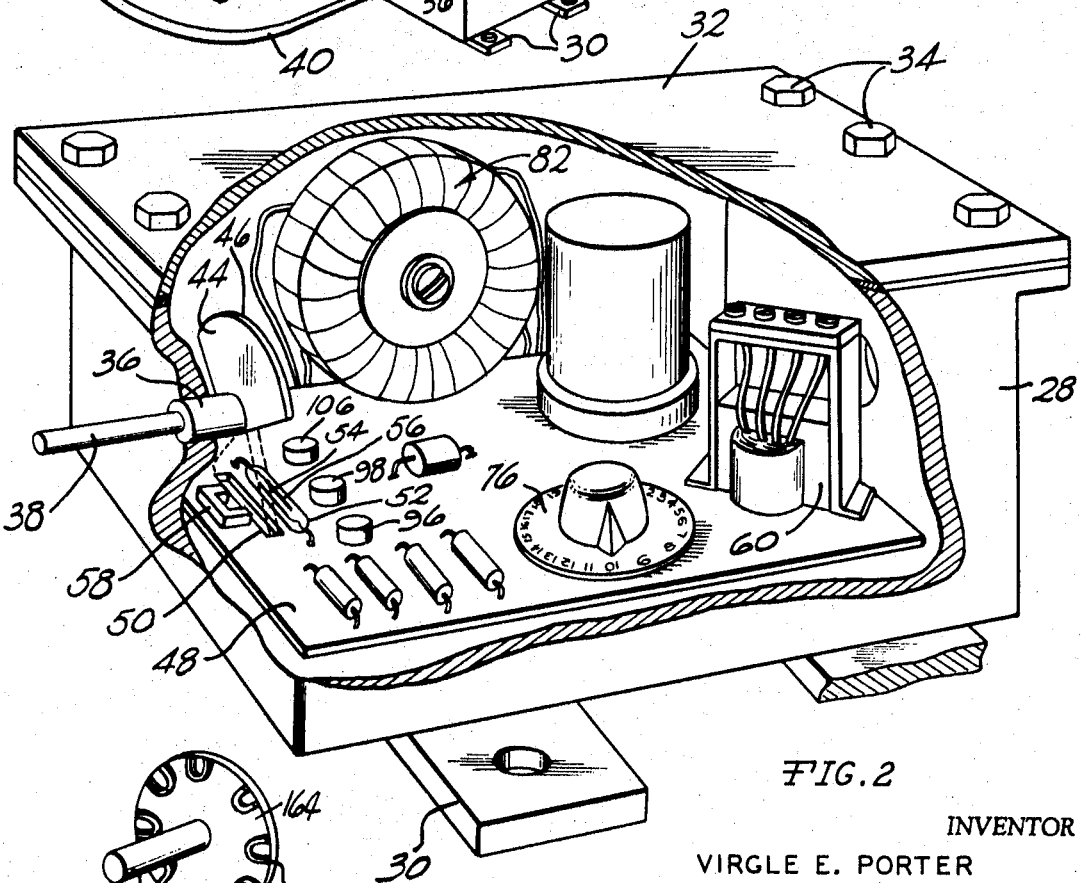
FIG.2
FIG.5
INVENTOR
VIRGLE E. PORTER
BY *Beaman & Beaman*
ATTORNEYS Oct. 27, 1970    V. E. PORTER    3,536,977
CONTROL CIRCUIT FOR STOPPING A MOTOR IN RESPONSE
TO A TORQUE OVERLOAD
Filed Aug. 21, 1967    2 Sheets-Sheet 2

INVENTOR
VIRGLE E. PORTER
BY *Beaman & Beaman*
ATTORNEY

United States Patent Office 3,536,977
Patented Oct. 27, 1970

3,536,977
CONTROL CIRCUIT FOR STOPPING A MOTOR IN RESPONSE TO A TORQUE OVERLOAD
Virgle E. Porter, Country Club Hills, Ill., assignor to Amtron, Inc., Midlothian, Ill., a corporation of Illinois
Filed Aug. 21, 1967, Ser. No. 661,895
Int. Cl. H02h 7/085
U.S. Cl. 318—461                           11 Claims

ABSTRACT OF THE DISCLOSURE

A control circuit effectively senses a preset margin of departure from the normal rotational speed of a device to thereby actuate control apparatus. The control circuit receives a signal for a time interval in each cycle of rotation according to the rotational speed of the device and if this signal is of both an appropriate duration and amplitude the control apparatus is actuated. The necessary duration of the signal is inversely related to its amplitude, hence, a simple signal amplitude adjustment permits the control circuit to be accommodated to any device rotational speed over a wide range. The circuit may also be used to directly sense rotational speed. Other features are disclosed.

INTRODUCTION

The present invention lies in the field of control circuits for sensing rotational speeds of devices, such as motors or the like, to thereby actuate certain control mechanisms.

SUMMARY OF THE INVENTION

It is an object of the present invention to provide economical control apparatus which accurately senses a departure in the normal rotational speed of the device to thereby effect a predetermined control function.

It is another object of the present invention to provide such control apparatus which is readily and accurately adjustable to sense any desired margin of departure from any preselected nominal speed within a wide range.

It is yet another object of the invention to provide a control circuit which almost instantly senses the predetermined departure in the normal rotational speed of a device.

It is still another object of the invention to provide a control circuit of the foregoing type which is especially well-suited for use with devices having relatively slow rotational speeds.

It is a more specific object of the present invention to provide a protective motor control circuit which shuts off the motor when excessive loading of the motor causes a predetermined reduction in its normal rotational speed.

Accordingly, the present invention is directed to an electronic control circuit for actuating control apparatus in response to a device attaining a predetermined rotational speed. Specifically, the control circuit comprises sensing means which are responsive to the rotational speed of the device for developing periodic electrical signals of a predetermined amplitude and of an individual duration related to the rotational speed. Circuit means, coupled to the sensing means, are responsive to an electrical signal of a duration exceeding a predetermined minimum value for actuating the control device.

BRIEF DESCRIPTION OF THE DRAWINGS

The aforementioned objects and advantages of the invention will be apparent from the following description and accompanying drawings wherein:

FIG. 1 is a perspective view of an electric motor driving a screw conveyor, and illustrating one context in which the control apparatus of the present invention is useful;

FIG. 2 is a perspective view, partly in section, of the housing and components of the control apparatus in accordance with the invention;

FIG. 5 is a perspective view of a segmented ferromagnetic disk which forms part of the control apparatus for sensing the rotational speed of a motor.

DESCRIPTION OF THE PREFERRED EMBODIMENTS

Figure 3:
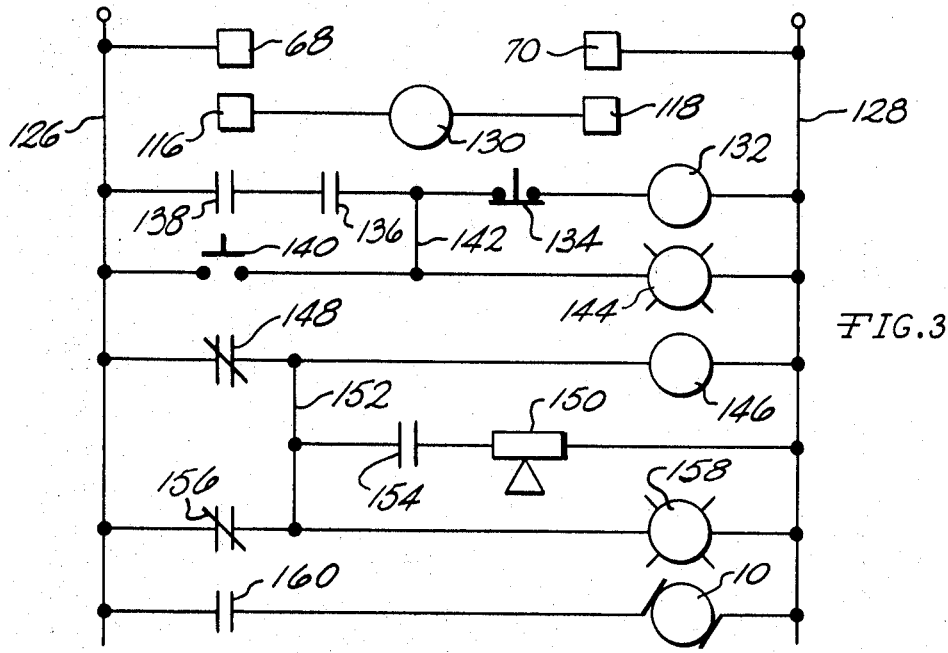
FIG. 3 is a schematic wiring diagram illustrating the interconnection of the control circuit with the electric motor and various ancillary operating switches and warning devices.

For convenience, the present invention will be described in the context of a protective circuit for an electric motor, although its more general utility will be understood to those skilled in the art. In this regard, FIG. 1 illustrates a typical motor drive system in connection with which the present control circuit is useful. Specifically, an electric motor 10 is provided with a pair of electrical conductors 12 which are connected to a switch relay box 14. The switch box 14 is connected to an alternating current supply source through an electric supply line 16 and is also electrically connected by conductors to the control system in accord with the invention, as will be later described. The electric motor 10 is provided with a rotatable drive shaft (not shown) which is in driving connection with a feed screw 18 mounted within an open trough 20 closed at its opposite ends by end closure brackets 22. The electric motor housing may include speed reduction gearing where the feed screw 18 will be driven at a rate slower than that of the motor, but proportional to the rate of operating rotation thereof. The outer end 24 of the feed screw is supported within a bearing 26 mounted upon the left bracket 22.

The control apparatus in accord with the invention is mounted within a dustproof housing 28, which is illustrated as being of a rectangular configuration. Support legs 30 are defined upon the lower portion of the housing, and access to the housing is provided through a cover 32 which is removably connected to the housing by means of screw fasteners 34.

The housing 28 is provided with a cylindrical sleeve bearing 36, FIG. 2. A rotatable input shaft 38 is supported within the bearing 36 and includes an outer end which is adapted to be connected to one end of a flexible cable 40. The other end 42 of the flexible cable 40 is connected to the feed screw drive shaft end 24 (FIG. 1) and in this manner the input shaft 38 rotates at the same rate as the feed screw 18 when the motor 10 is energized.

Referring to FIG. 2, a disc 44 is fixed upon the shaft 38 for rotation therewith in a plane perpendicularly disposed to the axis of the shaft. The disc 44 is segmented and in one commercial embodiment of the invention extends through approximately 140° of arc. The outer confines of the disc are defined by a circular peripheral edge 46.

The electronic components of the control apparatus of the invention are preferably mounted upon a printed circuit board 48, fixed within the housing 28. The circuit board 48 is provided with a slot 50 in registration with the disc 44, and the disc extends below the slot during a part of each rotation of the shaft 38, as indicated by the dotted line representation of the disc in the drawing.

Mounted upon the circuit board 48 is a reed switch 52 of conventional construction consisting of an evacuated glass envelope having a pair of magnetic metallic reeds or contacts 54 and 56. Opposite the slot 50, and centrally disposed with respect to the slot, is a permanent magnet 58. The magnet 58 is of such characteristics and relationship to the reed switch 52 that, in the relationship shown in FIG. 2, the magnetic field produced by the magnet causes the reeds or contacts of the switch to close.

The segmented disc 44 is formed of a low reluctance material, and when the disc is interposed between the magnet 58 and the reed switch 52, as in the dotted line position, the influence of the magnet 58 upon the reed switch is interrupted, and the switch contacts open. Thus, during each rotation of the input shaft 38 the reed switch contacts 54 and 56 open and close once. The time interval for which the reed switch is closed during each complete rotation of the shaft is determined by the rotational speed of the input shaft 38, and the shape of the disc 44.

Figure 4:
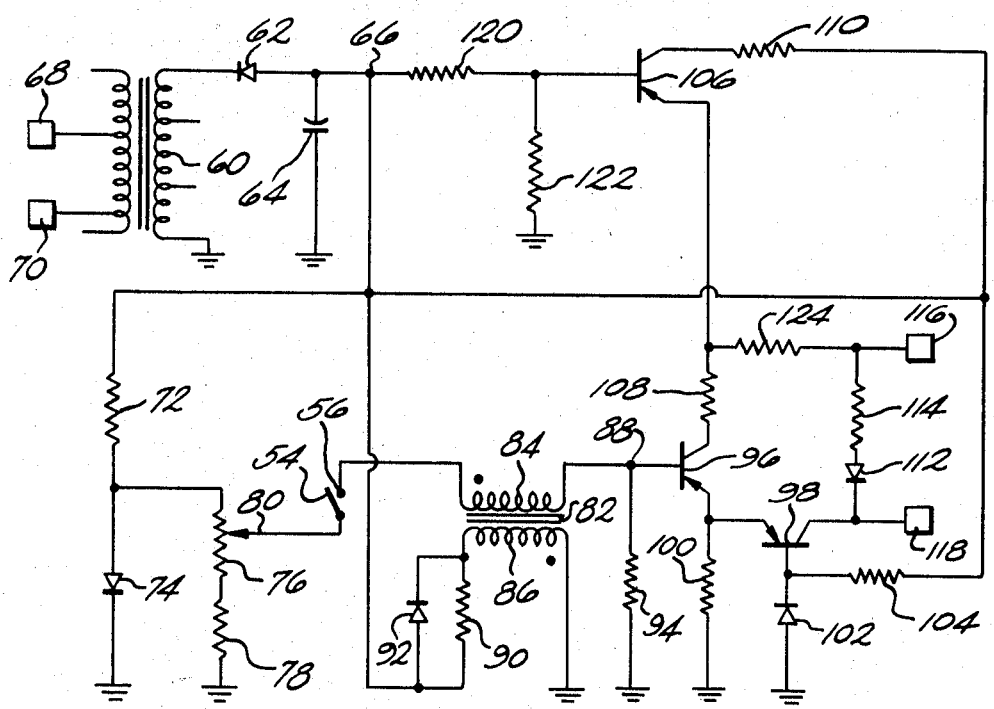
FIG. 4 is a schematic diagram of the electronic circuit employed in the present invention.

The electronic circuit employed with the invention is illustrated in FIG. 4. A power supply for the control circuit includes a step-down transformer 60 having one terminal of its secondary winding connected directly to ground and its opposite terminal coupled to ground through a diode 62 and a filter condenser 64. A negative 35 volt operating bias for the control circuit is provided by these components at the supply terminal 66. A conventional 110 volt alternating current source is connected to the primary winding of transformer 60 through terminals 68 and 70.

The control circuit includes a resistor 72 connected from the bias supply terminal 66 to ground through a Zener diode 74 which is effective to further regulate the bias voltage. The substantially constant bias voltage developed across Zener diode 74 is supplied to one terminal of a potentiometer 76 which is connected to ground by a resistor 78. An adjustable tap 80 of the potentiometer 76 is connected to the reed contact 54 of the switch 52.

The control circuit of the invention includes circuit means responsive to an electrical signal exceeding a predetermined minimum duration for actuating a protective control device, to be later described. In the illustrative embodiment, the control circuit utilizes a timing control element in the form of a saturable core reactor. The reactor includes a ferromagnetic core 82 having a primary coil 84 associated therewith as well as a reset coil 86. The core 82 is in the form of a toroid, and may be mounted to the sidewall of the housing 28 as shown in FIG. 2. The core constitutes an effective timing element for the control circuit as will presently be explained. To this end, the core is designed to have a rectangular hysteresis loop characteristic and for this purpose may be formed of any of a number of suitable ferromagnetic alloys known to the art. The primary coil 84 consists of many more turns than the reset winding 86 for reasons which will be later described.

One end of the primary coil 84 is connected to the switch contact 56, and the other end of the primary coil is connected to a terminal 88. One end of the reset coil 86 is grounded, and the other end is connected to the terminal 66 by a resistor 90 in parallel with a diode 92, the purpose of the diode being to protect the reed switch. A resistor 94 is connected from the terminal 88 to ground.

The electronic switching circuit includes three transistors which, in the present case, may be of the 2N404 type. The base of emitter follower transistor 96 is connected to terminal 88. The emitters of transistors 96 and 98 are connected through a common resistor 100 to ground. The base of the transistor 98 is connected to diode 102, and is connected to the negative 35 volt terminal 66 through a load resistor 104. The diode 102 is normally forward biased to provide a negative .6 volt reference voltage at the base of transistor 98. The collector of transistor 96 is connected to the emitter of transistor 106 through resistance 108, and the collector of transistor 106 is connected to terminal 66 through resistance 110. A diode 112 and a resistor 114 interconnect the terminal 116 with the terminal 118. The terminals 116 and 118 are connected to a 12 volt relay, which may be located within the motor switch box 14.

The transistor 106 is provided with an operating bias from the center tap of a voltage divider comprising series resistors 120 and 122 connected between the bias supply terminal 66 and ground. The transistor 106 merely serves to provide a −12 volt bias at the juncture of resistors 108 and 124, as is necessary for appropriate operation of the relay connected to the terminals 116, 118. If desired or more convenient, the transistor 106 and associated circuitry may be replaced by a −12 volt supply coupled to the junction of resistors 108 and 124.

FIG. 3 describes a typical wiring diagram using the apparatus of the invention. The 110 volt alternating current supply conductors 126 and 128 are respectively connected to transformer terminals 68 and 70; the output terminals 116 and 118 of the control circuit of FIG. 4 are connected to the motor control relay 130. A relay 132 is connected between the supply conductors through a normally closed "stop" push button switch 134, one pair of its own normally open contacts 136 and a normally open contact pair 138 of the relay 130. A normally open "start" push button switch 140 is connected to the relay 132 in shunt to contact pairs 136 and 138 by means of a conductor 142. A pilot light 144 is connected between the supply terminals in series with the start switch 140 and, accordingly, glows during normal operation of the apparatus.

It is occasionally desired that an audible warning signal be provided to indicate that the motor 10 has been stopped by the control circuit. To this end, a relay 146 is connected in series across the supply terminals with the normally closed contacts 148 of the relay 130. A horn 150 is connected to the common junction of the contact pair 148 and the relay 146 by a conductor 152 through a normally open contact pair 154 of the relay 146. Normally closed contacts 156 of the relay 132 are connected between conductor 152 and supply terminal 126 in shunt to contact pair 148. A lamp 158, which is actuated upon stopping of the motor 10, is connected across the supply terminals in series with the contact pair 156. Normally open contacts 160 of relay 132 are connected in series with the drive motor 10.

In operation, the motor 10 is energized by the operator momentarily depressing the "start" button 140 to energize relay 132 and thereby close motor start contacts 160 and also contact pair 136. Assuming that the motor 10 is not initially overloaded by the feed screw 18, the holding relay 130 is energized from terminals 116 and 118 of the control circuit to close its contact pair 138 and thereby maintain a holding circuit for relay 132. Release of the "start" button 140 may then occur, and the motor 10 will continue operation. The energizing of relays 130 and 132 opens contact pairs 148 and 156 of the light and horn warning circuit.

During normal operation of the motor 10, at its nominal predetermined rotational speed, the reed switch 52 is opened and closed, by the combination of the magnet 58 and the segmented rotating disc 44, once per revolution of the motor drive shaft. The time interval for which the contacts of the reed switch are closed during each revolution of the drive shaft is an inverse function of the rotational speed of the shaft. In other words, an increase in rotational speed of the shaft decreases the period during each revolution that the contacts are closed and vice versa.

The sensing means of the present invention is specifically responsive to a decrease in the predefined nominal rotational speed of the motor to actuate a control device, namely, the relay 130 which stops the motor. The slow-down in rotational speed of the motor is a prompt indication of abnormally high loading of the motor and permits stopping of the motor before it or the driven apparatus incurs any serious damage. However, under the assumed normal operating conditions, the sensing means remains in a quiescent state and an operating bias within appropriate quiescent limits is applied to the base of transistor 96.

Transistor 98 is normally biased into a saturated condition to provide the necessary 3 ma. of current for the holding relay 130 connected across output terminals 116, 118. To this end, the base of the transistor 98 is maintained at a fixed —.6 volt by virtue of the clamping diode 102 while the bias potential at the emitter of this transistor is regulated in accordance with the conduction of transistor 96, the transistor 96 normally maintaining the emitter of transistor 98 sufficiently positive with respect to the fixed base potential that the transistor switch 98 is in an on or saturated condition.

Transistor 96 is connected in an emitter follower configuration and is effective to translate the voltage sampled across the resistance 94 to an equal voltage across resistor 100. If this latter voltage exceeds the forward drop across diode 102 then the emitter of the transistor 98 is biased negatively with respect to its base and the transistor 98 is rendered non-conductive, thereby deactivating the relay 130.

The amplitude of the sampling vcoltage across the resistor 94 is abruptly increased if the current flowing in coil 84 of the sensing means is of sufficient amplitude and duration to fully saturate the core 82. In this regard, the primary coil 84 is energized by closure of the contacts of the reed switch 52 to produce a magnetic force within the core 82, and the core thus begins to saturate. The rate at which full saturation is approached is determined by the magnitude of the voltage being supplied to the reed switch through the variable resistance 76. However, in normal operation, the contacts of the reed switch 52 open prior to full saturation of the core 82 and the constant current flowing within the reset coil 86 produces a magnetic force within the core 82 oppositely to that produced by the primary coil 84 to restore the coil to an original condition prior to the next operating cycle. Hence, the sensing means is effective to measure the rotational speed of the motor anew with each rotation of the drive shaft. This permits an almost instantaneous check on rotational speed and permits power to the motor to be removed with like dispatch.

Should the input shaft 38 rotate at a rate of rotation less than that desired, due to the feed screw 18 clogging or otherwise producing an overload condition, the time interval per rotation that the reed switch contacts remain closed is increased in direct proportion thereto. If the time integrated value of the voltage applied across the coil 84 is sufficiently great to override the constant signal across reset coil 86 and drive the core 82 into full saturation, an abruptly increased signal voltage is momentarily developed across the sampling resistor 94. This voltage is translated to the emitter resistor 100 of the isolating transistor 96 to thereby bias the transistor 98 to an off or non-conductive condition momentarily deenergizing the relay 130. Deenergizing of relay 130 opens contacts 138, which opens relay 132, and thereby opens contacts 160 to stop the motor 10. Simultaneously, contacts 148 and 156 will close energizing relay 146 which closes contacts 154 and sounds the horn 150 and energizing warning lamp 158, indicating to the operator that attention is required.

As previously stated, the time required to saturate core 82 is inversely related to the voltage applied across the coil 84. Specifically, the time relationship is determined by Maxwell's equation $$T = \frac{MN10^{-8}}{E}$$

where T equals time in seconds; M equals total flux of the core in Maxwell's; N equals the number of the energizing coil turns of wire; and E equals the applied voltage. Since the voltage applied to coil 84 is determined by the setting of the adjustable tap 80 of the potentiometer 76, the core may be set to saturate at any preselected rotational speed of the motor shaft and the potentiometer may be calibrated to read directly in r.p.m. to facilitate such setting. In other words, the margin of departure from a known rotational speed needed to saturate the timing core 82 may be conveniently made extremely large or small as desired. However, regardless of the range of departure the selected circuit will always instantly respond when that value is attained. Furthermore, the time required for saturation of core 82 is relatively long which permits advantageous use of the circuit with motors or the like having normally slow rotational speeds.

A modification of the reed switch actuator illustrated in FIG. 5 permits accurate sensing at even lower speeds of rotation of the input shaft. In FIG. 5 the input shaft is represented at 162, and a circular disc 164 is mounted thereon for rotation with the shaft. A plurality of permanent magnets 166 are fixed to the disc 164 adjacent the periphery thereof, and evenly spaced relative to the circumference of the disc. In operation, the periphery of the disc 164 is located adjacent the reed switch 52 wherein, if eight magnets are mounted upon the disc, the reed switch will be alternately energized and deenergized eight times for each rotation of the input shaft. This is equivalent as far as the sensing circuit is concerned, to rotation of the shaft at an eight times faster rate.

Although the control circuit has been described in the context of sensing a departure in rotational speed, it will be appreciated by those skilled in the art that the circuit is in fact an absolute rotational speed sensor and has full utility in this context as well.

It will be appreciated that various modifications to the invention may be apparent to those skilled in the art without departing from the spirit and scope thereof, and it is intended that the invention be limited only by the scope of the following claims.

I claim:

1. An electronic control circuit for actuating control apparatus in response to a predetermined departure in the normal rotational speed of a device, comprising:
   sensing means responsive to the rotational speed of said device for developing during each rotational cycle of said device at least one electrical pulse signal having a cumulative energy value related to said rotational speed;
   circuit means coupled to said sensing means and responsive to the presence of a one of said electrical pulse signals having a cumulative energy value in excess of predetermined threshold value for actuating said control apparatus.

2. An electronic control circuit for actuating control apparatus in response to a device attaining a predetermined rotational speed, comprising:
   sensing means responsive to the rotational speed of said device for developing periodic electrical pulse signals of an individual duration related to said rotational speed;
   circuit means coupled to said sensing means and responsive to the presence of one of said individual electrical pulse signals having a duration exceeding a predetermined minimum value for actuating said control apparatus.

3. The combination according to claim 2 in which said circuit means is only responsive to an electrical signal having a predetermined minimum time integrated amplitude over the duration of said signal.

4. The combination according to claim 3 and further including selector means for adjustably preselecting the amplitude of said periodic electrical signals for effectively selecting the rotational speed at which said control apparatus is actuated.

5. The combination according to claim 4 in which said sensing means comprises a circuit breaker means for interrupting a continuous current flow of said preselected amplitude to said circuit means for a time interval in each rotational cycle which is proportional to said rotational speed.

6. The combination according to claim 5 in which said circuit breaker means includes a switch operable in response to an applied magnetic field, a magnet for developing a magnetic field effective to operate said switch and magnet control means responsive to said rotational speed for rendering said magnet ineffective to operate said switch for a predetermined portion of each rotational cycle of said device.

7. The combination according to claim 6 in which said magnet control means consists of a segmented disc mounted for angular rotation with said device for periodically interrupting said magnetic field applied to said switch from said magnet.

8. The combination according to claim 7 in which said circuit means comprises a saturable core reactor having a core with a predetermined nominal bias condition and which core is biased toward a predetermined full saturation condition by said periodic electrical signals developed by said sensing means.

9. The combination according to claim 8 in which said circuit means further includes reset means for restoring said core to said predetermined nominal condition in the interval during which said magnetic field is interrupted.

10. The combination according to claim 9 in which said restoring means includes a coil wound about said core of said saturable reactor and having a predetermined constant current flow therein.

11. The combination according to claim 5 in which said circuit breaker means comprises a switch operable in response to an applied magnetic field and a disc mounted for rotation with said device and having a plurality of magnets mounted in spaced relation about the periphery thereof for opening and closing said switch a number of times per rotational cycle of said disc in correspondence to the number of said magnets on said disc.

References Cited

UNITED STATES PATENTS

| | | | |
|---|---|---|---|
| 1,047,557 | 12/1912 | Owens | 318—461 X |
| 1,849,847 | 3/1932 | Mittnacht | 318—461 |
| 2,250,141 | 7/1941 | Thurston | 318—461 |
| 2,472,526 | 6/1949 | Frazee | 318—461 X |
| 3,358,199 | 12/1967 | Jones | 318—227 X |
| 3,365,615 | 1/1968 | Bart | 318—461 X |
| 3,389,321 | 6/1968 | Miller | 318—461 X |

ORIS L. RADER, Primary Examiner

T. LANGER, Assistant Examiner